(12) United States Patent
Miesner

(10) Patent No.: US 11,716,003 B1
(45) Date of Patent: Aug. 1, 2023

(54) ELECTROMAGNETIC ARRAYS

(71) Applicant: The Government of the United States of America, as represented by the Secretary of the Navy, Arlington, VA (US)

(72) Inventor: John E. Miesner, Fairfax, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 24 days.

(21) Appl. No.: 17/689,039

(22) Filed: Mar. 8, 2022

(51) Int. Cl.
*H02K 33/06* (2006.01)
*H02K 35/02* (2006.01)
*H02K 35/04* (2006.01)

(52) U.S. Cl.
CPC ............. *H02K 33/06* (2013.01); *H02K 35/02* (2013.01); *H02K 35/04* (2013.01)

(58) Field of Classification Search
CPC ........ H02K 35/00; H02K 35/02; H02K 35/04; H02K 35/06; H02K 7/1869; H02K 7/1876; H02K 7/1892; H02K 33/00; H02K 33/02; H02K 33/16
USPC ....... 310/15–29, 81, 80, 321, 28–30, 36–37, 310/40 mm; 381/400–422; 359/824
See application file for complete search history.

(56) References Cited

U.S. PATENT DOCUMENTS

| | | | | |
|---|---|---|---|---|
| 4,346,318 A * | 8/1982 | Shtrikman | ............. | H02K 33/06 310/12.24 |
| 4,831,292 A * | 5/1989 | Berry | ............. | H02K 33/06 310/23 |
| 5,587,615 A * | 12/1996 | Murray | ............. | H02K 33/16 310/15 |
| 6,323,568 B1 * | 11/2001 | Zabar | ............. | H02K 33/04 310/12.24 |
| 6,914,351 B2 * | 7/2005 | Chertok | ............. | H02K 35/02 310/12.26 |
| 7,633,189 B2 * | 12/2009 | Iwasa | ............. | H02K 41/03 310/15 |
| 7,687,943 B2 * | 3/2010 | Lunde | ............. | H02K 7/1846 310/58 |
| 8,368,268 B2 * | 2/2013 | Hasegawa | ............. | G02B 21/248 359/381 |
| 8,456,032 B2 * | 6/2013 | Hochberg | ............. | H02K 7/06 290/43 |
| 8,704,387 B2 * | 4/2014 | Lemieux | ............. | F03G 7/08 290/1 R |
| 8,941,251 B2 * | 1/2015 | Zuo | ............. | H02K 35/02 290/1 R |
| 9,240,267 B2 * | 1/2016 | Nagahara | ............. | H02K 35/02 |
| 9,906,109 B2 * | 2/2018 | Endo | ............. | H02K 33/16 |
| 10,404,150 B2 * | 9/2019 | Swanson | ............. | H02K 35/06 |
| 10,447,133 B2 * | 10/2019 | Jin | ............. | H02K 33/18 |
| 10,547,233 B2 * | 1/2020 | Jin | ............. | H02K 5/04 |
| 10,581,355 B1 * | 3/2020 | Dyson | ............. | H02P 6/005 |

(Continued)

*Primary Examiner* — Maged M Almawri
(74) *Attorney, Agent, or Firm* — Dawn C. Russell; Jesus J. Hernandez

(57) ABSTRACT

An electromagnetic inertial force generator is provided, which includes radially polarized permanent magnets providing bias flux across axial gaps to combine with axial coil flux to linearize flux output. An array of components is integrated into a single structure that is more compact and lighter than a monolithic force generator, providing the same level of performance while using less permanent magnet material.

17 Claims, 20 Drawing Sheets

(56) References Cited

U.S. PATENT DOCUMENTS

| | | | | |
|---|---|---|---|---|
| 10,674,278 B2* | 6/2020 | Zhou | H04R 9/025 |
| 10,848,044 B1 | 11/2020 | Miesner | |
| 10,930,838 B1* | 2/2021 | Miesner | H02N 2/043 |
| 10,998,487 B1* | 5/2021 | Miesner | H10N 35/80 |
| 11,239,736 B1 | 2/2022 | Miesner | |
| 11,309,808 B1* | 4/2022 | Li | H02K 35/02 |
| 11,522,429 B2* | 12/2022 | Takahashi | H02K 33/16 |
| 11,569,723 B2* | 1/2023 | Ma | H02K 33/18 |
| 2003/0127916 A1* | 7/2003 | Godkin | H02K 41/0356 310/12.16 |
| 2006/0044093 A1* | 3/2006 | Ohta | H02K 99/20 335/220 |
| 2008/0174187 A1* | 7/2008 | Erixon | H02K 33/16 310/15 |
| 2011/0133577 A1* | 6/2011 | Lee | H02K 33/18 310/15 |
| 2011/0316361 A1* | 12/2011 | Park | H02K 33/16 310/25 |
| 2012/0242086 A1* | 9/2012 | Yang | H02K 35/02 290/50 |
| 2012/0242175 A1* | 9/2012 | Yang | H02K 35/02 310/30 |
| 2012/0313459 A1* | 12/2012 | Zhang | H02K 33/18 310/25 |
| 2013/0093266 A1* | 4/2013 | Hong | H02K 33/18 29/446 |
| 2014/0035397 A1* | 2/2014 | Endo | H02K 33/18 310/30 |
| 2014/0054983 A1* | 2/2014 | Moon | H02K 33/16 310/28 |
| 2014/0062224 A1* | 3/2014 | Kim | H02K 33/16 310/15 |
| 2015/0137628 A1* | 5/2015 | Endo | H02K 33/16 310/25 |
| 2016/0164389 A1* | 6/2016 | Jang | H02K 7/116 310/20 |
| 2018/0250107 A1* | 9/2018 | Dai | H02K 1/2791 |
| 2019/0044425 A1* | 2/2019 | Zu | H02K 33/02 |
| 2019/0151895 A1* | 5/2019 | Takahashi | H02K 33/18 |
| 2020/0412221 A1* | 12/2020 | Yan | H02K 33/16 |
| 2020/0412226 A1* | 12/2020 | Ma | H02K 33/16 |
| 2022/0255412 A1* | 8/2022 | Wang | H02K 33/16 |

\* cited by examiner

ELECTROMAGNETIC ARRAYS

FIELD OF THE INVENTION

The invention provides an electromagnetic inertial force generator, which includes radially polarized permanent magnets providing bias flux across axial gaps to combine with axial coil flux to linearize force output. An array of components is integrated into a single structure that is more compact and lighter than a monolithic force generator, providing the same level of performance while using less permanent magnet material.

BACKGROUND OF THE INVENTION

Permanent magnets may be used to linearize the response of an electromagnetic actuator.

For example, U.S. Pat. No. 10,848,044, issued to Miesner, uses radial permanent magnets between inner and outer flux cylinders to provide magnetic bias across two axial air gaps and uses a current conducting coil to drive magnetic flux across the same axial air gaps. The magnetic bias flux is in opposite directions across the two air gaps while the coil flux across the two gaps is in the same direction. The combination of bias flux and coil flux cancels in one gap, and adds in the other gap, producing a net force on an inertial mass and an equal and opposite force on the supporting structure. The resulting force is linear with current through the drive coil.

A goal of linear electromagnetic actuator design is to minimize the amount of permanent magnet material required to establish the bias flux. Permanent magnets are relatively expensive and commonly use materials, such as neodymium, which have a limited supply. A second goal is to minimize the amount of magnetic flux conducting material since this material is heavy and may require lamination to reduce eddy current losses.

The amount of permanent magnet and flux conducting material required depends on the reluctance of the magnetic circuit. Since permanent magnets have a permeability approximately equal to air, a major part of the magnetic circuit reluctance is due to the magnet itself. A magnetic circuit arrangement that uses several thin magnets may require less material than an equivalent circuit with one thick magnet.

There is a need in the art for electromagnetic designs that efficiently integrate an array of smaller components to achieve the same performance as a monolithic actuator, while using less permanent magnet and flux conducting material, reducing total size and cost.

SUMMARY OF THE INVENTION

The invention described herein, including the various aspects and embodiments thereof, meets the needs of the art, as well as others, by providing an electromagnetic inertial force generator, which includes radially polarized permanent magnets providing bias flux across axial gaps to combine with axial coil flux to linearize flux output. An array of components is integrated into a single structure that is more compact and lighter than a monolithic array, providing the same level of performance while using less permanent magnet material.

The electromagnetic inertial force generators of the invention include a lower assembly; an upper assembly; stationary shafts, that connect the upper assembly to the lower assembly; a magnet assembly; linear bearings that slidably mount the magnet assembly to the stationary shafts; springs between the magnet assembly and the lower assembly; and springs between the magnet assembly and the upper assembly. A lower air gap separates the magnet assembly from the lower assembly. An upper air gap separates the magnet assembly from the upper assembly. The magnet assembly includes: an array of inner flux conductors; an outer flux conductor; and radially polarized permanent magnets between and in contact with the inner flux conductors and outer flux conductor. Each inner flux conductor is provided with a corresponding coil.

The electromagnetic inertial force generators may incorporate a one-dimensional array of inner flux conductors, or a two-dimensional array.

In some aspects of the invention, the lower and upper assemblies each independently include lower and upper coil holder plates; and coils embedded in each of the lower and upper coil holder plates, each coil corresponding to and aligned with an inner flux conductor.

In additional aspects of the invention, the inner flux conductors each independently include coils provided around upper and lower ends of the inner flux conductor, wherein the coils are provided adjacent to the radially polarized permanent magnets.

In further aspects of the invention, the inner flux conductors each independently include a coil provided around the inner flux conductor, wherein each coil is provided between two sets of radially polarized permanent magnets.

Other features and advantages of the present invention will become apparent to those skilled in the art upon examination of the following or upon learning by practice of the invention.

BRIEF DESCRIPTION OF THE DRAWINGS

The present invention will now be described, by way of example, with reference to the accompanying drawings, wherein like numbers indicate same or similar parts or components, and wherein.

DETAILED DESCRIPTION OF THE INVENTION

Figure 1:
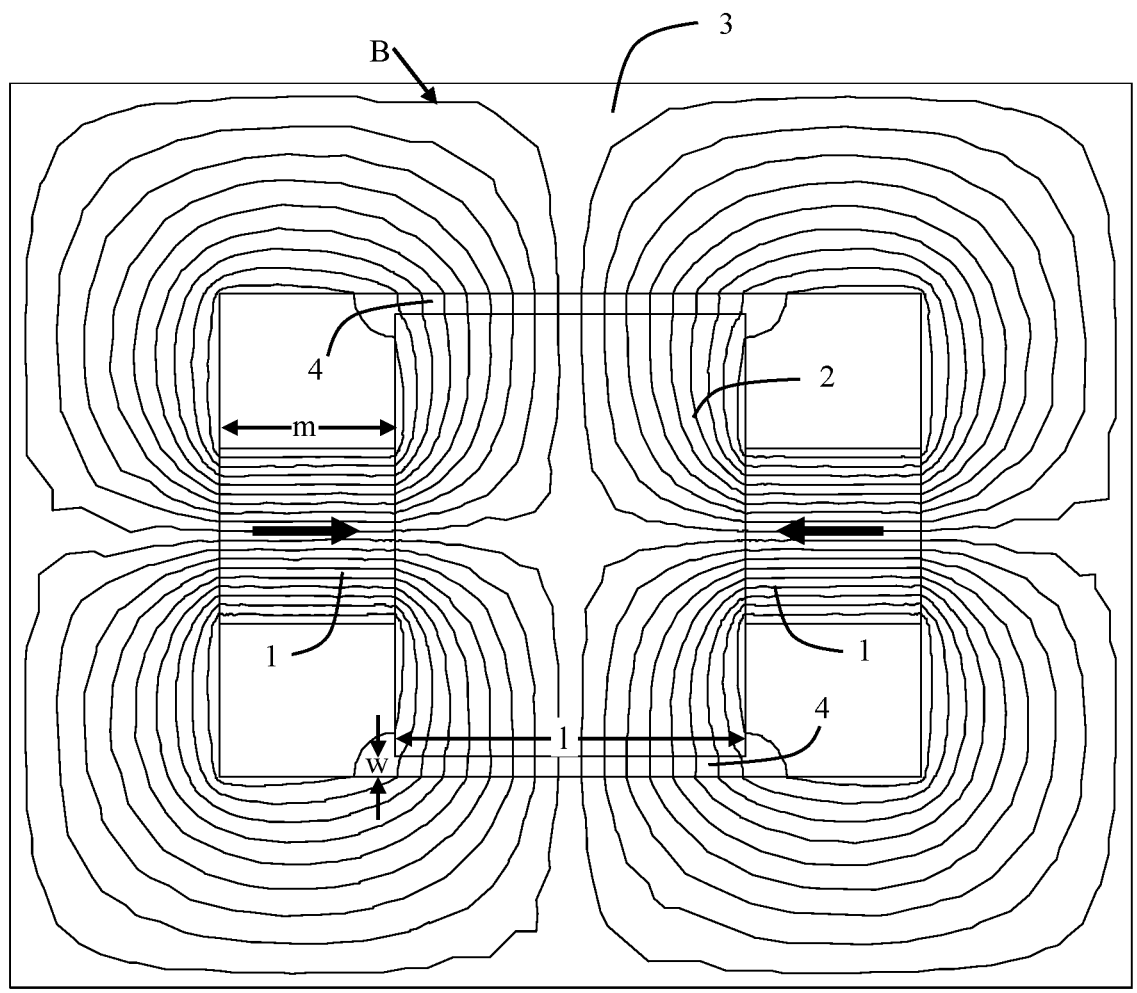
FIG. 1 is an illustrative example using two radial permanent magnets to provide magnetic flux across two axial gaps.

The invention provides an electromagnetic inertial force generator, which includes radially polarized permanent magnets providing bias flux across axial gaps to combine with axial coil flux to linearize flux output. An array of components is integrated into a single structure that is more compact and lighter than a monolithic force generator, providing the same level of performance while using less permanent magnet material.

The invention beneficially improves coil cooling by embedding the coils in the stationary portion of the array so that coil heat is directly transferred to a coil holder plate, which is formed from a material such as steel or magnetic stainless steel, which has a much higher thermal conductivity than air. In other aspects, coil cooling is provided by providing the coils between inner and outer flux conductors, which are also formed from steel.

The invention includes a magnet assembly that moves relative to upper and lower coil assemblies as allowed by axial gaps between the assemblies. The magnet assembly is slidably mounted by linear bearings to stationary shafts that connect the upper and lower assemblies. Springs between the magnet assembly and the upper and lower assemblies provide a restoring and centering force. Movement of the magnet assembly generates axial inertial forces.

The magnet assembly includes an array of inner flux conductors surrounded by a single outer flux conductor. Radially polarized permanent magnets are between and in contact with the inner and outer flux conductors. In some aspects, the assemblies include wound coils embedded in coil holder plates, where each coil corresponds to and is aligned with an inner flux conductor. In other aspects, the coils are embedded in the magnet assembly, between the inner and outer flux conductors.

The radially polarized permanent magnets provide bias flux across the axial gaps to combine with the coil flux and linearize the force produced. Permanent magnet flux flows from a permanent magnet into an inner flux conductor, across the lower gap or upper gap, through the coil holder plate, back across the lower gap or upper gap to the outer flux conductor, and then back to the permanent magnet in a closed loop. Coil current flux may vary depending on the placement of the coils with respect to the magnet assembly.

According to a first embodiment of the invention, coil current flux may flow around two coils in a complete loop from lower coil holder plate, across lower gap, through outer flux conductor, across upper gap, through upper plate, back across upper gap, through inner flux conductor, and back across the lower gap to the lower plate.

According to a second embodiment of the invention, coil current flux may flow around two coils in a complete loop from inner flux conductor, across lower gap, through lower plate, back across lower gap and through outer flux conductor, across upper gap, through upper plate, and back across the upper gap to the inner flux conductor.

According to a third embodiment of the invention, coil current flux may flow around a single coil in a complete loop from outer flux conductor, across upper gap, through upper plate, back across upper gap, through inner flux conductor, across lower gap, through lower plate, and back across the lower gap to the outer flux conductor.

Permanent magnet flux and coil current flux are in the same direction and add in the lower gap while they are in opposite directions and tend to cancel in the upper gap. Thus, there is a net downward magnetic force on the magnet assembly causing the assembly to move and generate inertial forces that are linear with current through the drive coils. When current through the drive coils is reversed, the direction of coil current flux also reverses and the combination of permanent magnet flux and coil flux cancels in the lower gap and adds in the upper gap producing a net upward force on the magnet assembly. Thus, inertial forces generated are both linear and reversible.

In alternate embodiments, different numbers and arrangements of inner flux conductors, radial magnets, and drive coils may be used as long as the magnetic flux across the two gaps from the magnet ring or rings is in opposite directions across the gaps and the flux from the drive coil or coils is in the same direction across the two gaps.

These and other aspects of the invention are further described by reference to the accompanying figures.

FIG. 1 is an example finite element model with outer flux conducting material (3) and inner flux conducting material (2) forming top and bottom gaps (4) between them. The width of gaps (4) is w and the length is l as shown. Radially polarized permanent magnets (1) with thickness m are also between and in contact with outer flux conducting material (3) and inner flux conducting material (2). Calculated magnetic lines of flux (B) are shown forming complete loops through radially polarized permanent magnets (1), inner flux conducting material (2), across top and bottom gaps (4), through outer flux conducting material (3), and back to magnets (1). In this example, the magnetic flux density in gaps (4) is approximately 0.55 Tesla.

Figure 2:
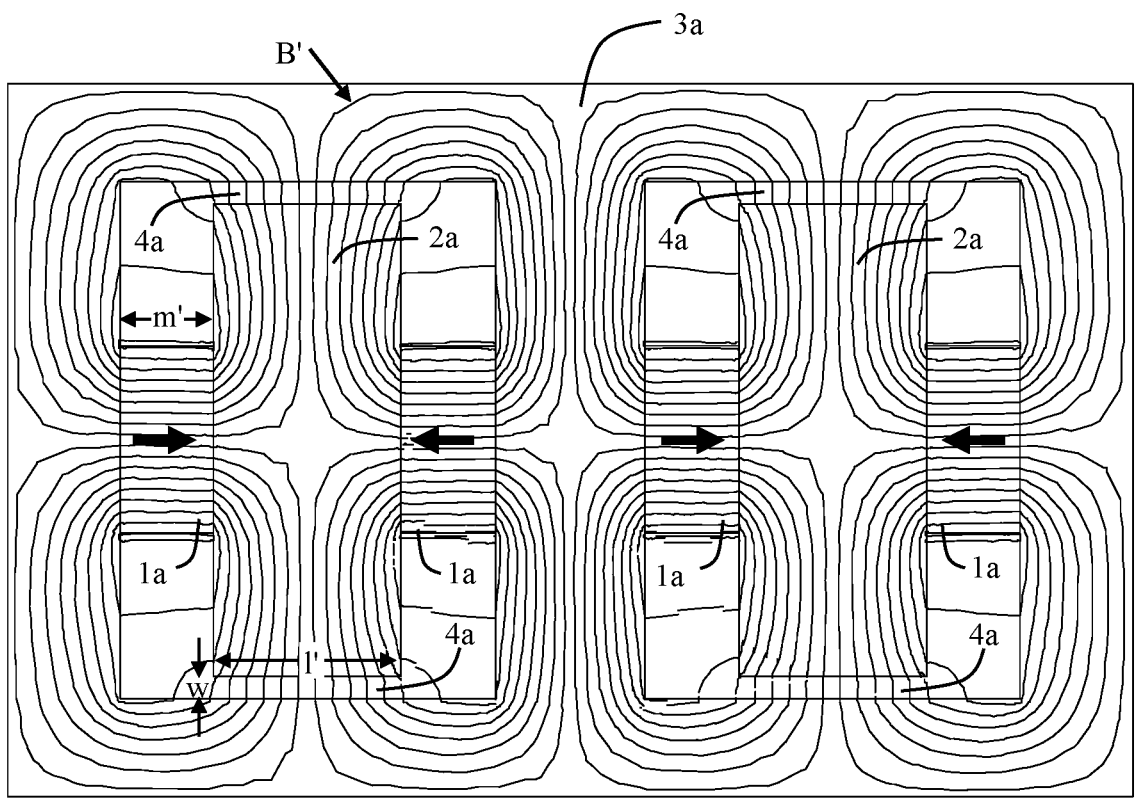
FIG. 2 is an illustrative example using four radial permanent magnets to provide magnetic flux across four axial gaps.

FIG. 2 is an example finite element model similar to FIG. 1, but with four radial permanent magnets and four axial gaps. Outer flux conducting material (3a) and inner flux conducting material (2a) form top and bottom gaps (4a) between them. The width of gaps (4a) is w as in FIG. 1, and the length is l' which is half of l. Thus, the total axial gap area of (4a) is the same as gap (4). Radially polarized permanent magnets (1a) with thickness m' are also between and in contact with outer flux conducting material (3a) and inner flux conducting material (2a). The magnet thickness m' is half of the FIG. 1 magnet thickness m. Thus, the total amount of permanent magnet material is the same in the two examples. Calculated magnetic lines of flux (B') are shown forming complete loops through radially polarized permanent magnets (1a), inner flux conducting material (2a), across top and bottom gaps (4a), through outer flux conducting material (3a), and back to magnets (1a). In this example, the magnetic flux density in gaps (4a) is approximately 0.8 Tesla for an increase in permanent magnet effectiveness of 45% compared to the FIG. 1 example. Also, the total amount of magnetic flux conducting material in FIG. 2 is 65% of that in FIG. 1.

Taken together, FIG. 1 and FIG. 2 illustrate that an arrangement with twice as many permanent magnets of half the thickness may be more effective in biasing an equivalent magnetic gap, while reducing the flux conducting material required.

Figure 3A:
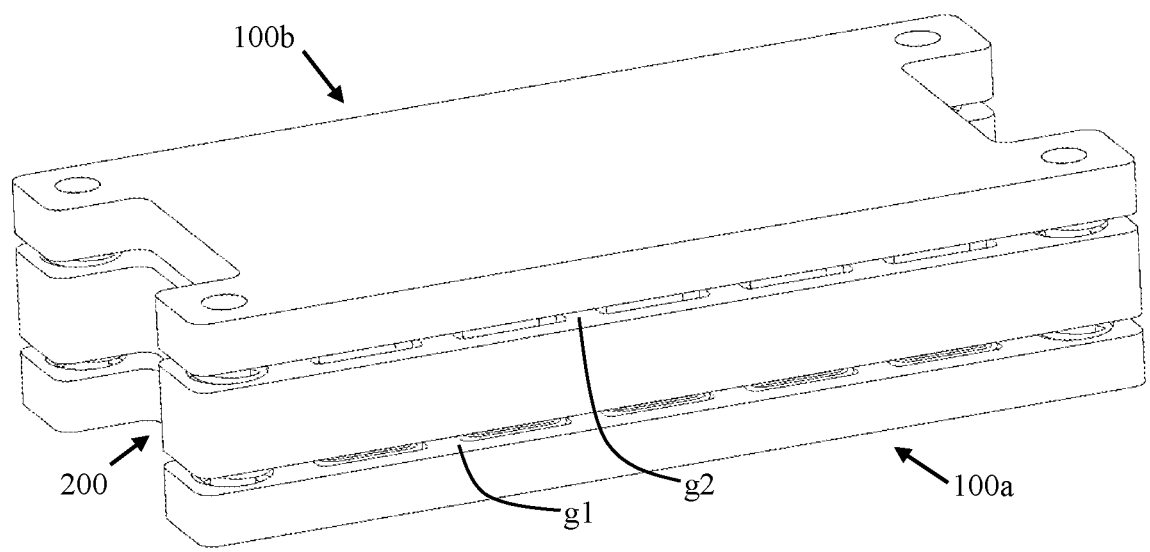
FIG. 3A is an overall view of a one-dimensional electromagnetic array actuator according to a first embodiment of the present invention.
Figure 3B:
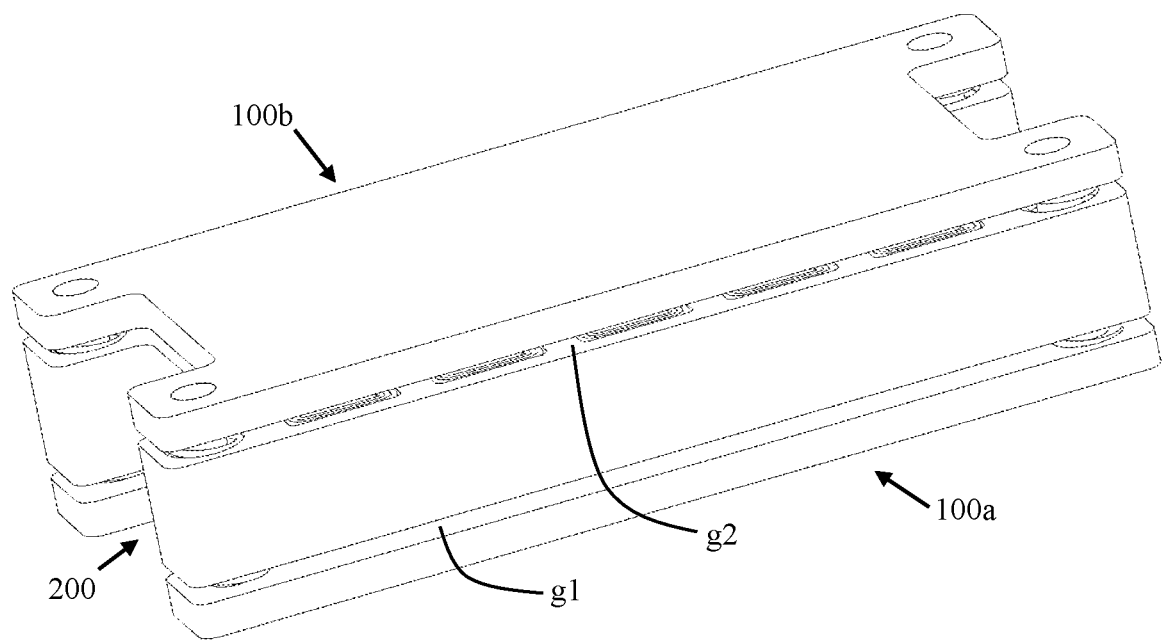
FIG. 3B is an overall view of a one-dimensional electromagnetic array actuator according to a second embodiment of the present invention.
Figure 3C:
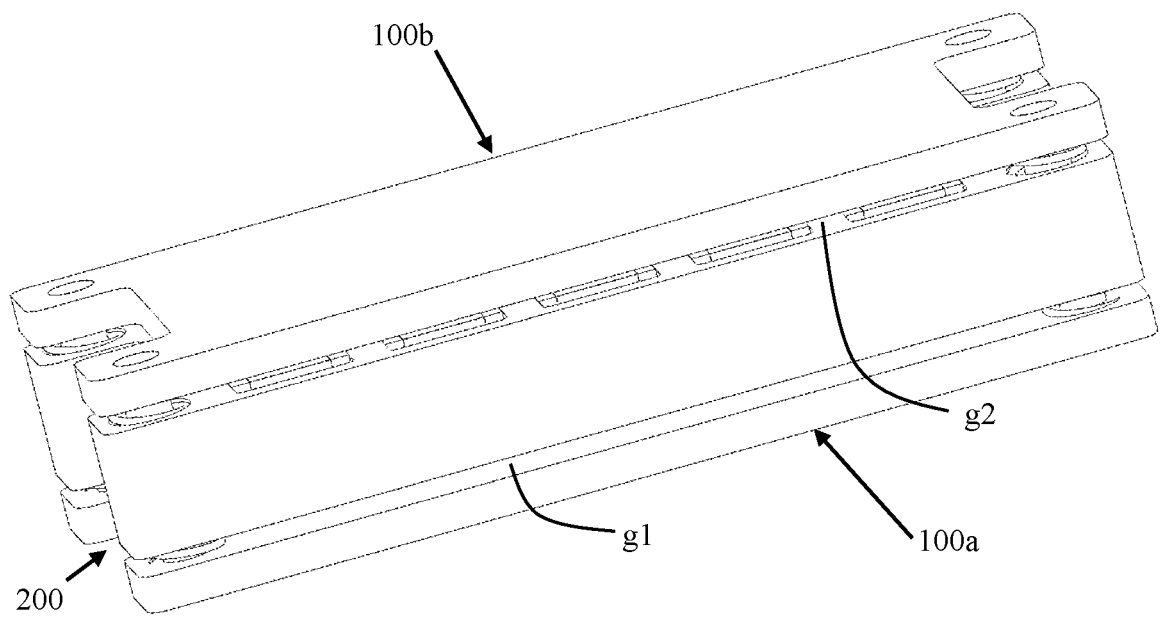
FIG. 3C is an overall view of a one-dimensional electromagnetic array actuator according to a third embodiment of the present invention.

FIGS. 3A, 3B, and 3C are overall views of a one-dimensional electromagnetic array (10) showing magnet assembly (200) between lower and upper coil assemblies (100a, 100b). Also shown is gap (g1) between magnet assembly (200) and lower coil assembly (100a) and gap (g2) between magnet assembly (200) and upper coil assembly (100b). Magnet assembly (200) moves relative to lower and upper coil assemblies (100a, 100b) as allowed by gaps (g1) and (g2). Movement of magnet assembly (200) generates inertial forces.

Figure 4A:
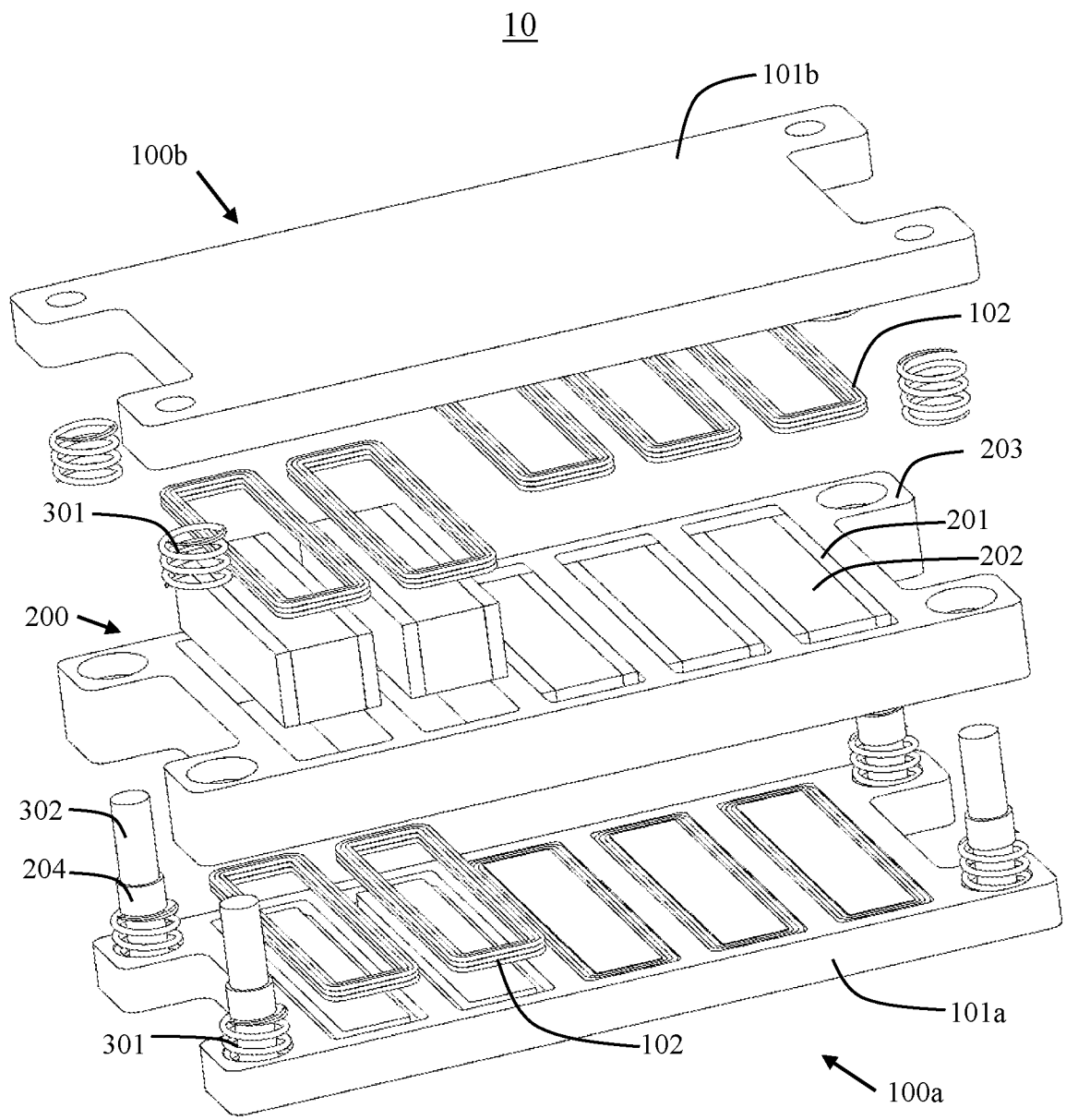
FIG. 4A is an exploded view of the one-dimensional electromagnetic array actuator of FIG. 3A.

FIG. 4A is an exploded view of the one-dimensional electromagnetic array (10) of FIG. 3A, showing the internal components. Magnet assembly (200) includes magnets (201) between and in contact with inner flux conductors (202) and outer flux conductor (203). As shown, there are five inner flux conductors (202) and five pairs of magnets (201) forming a one-dimensional array, though the invention is not to be construed as limited to any particular number of magnet pairs. Arrays of from two to about 10 pairs of magnets are preferred in some aspects of the invention. Coil assemblies (100a, 100b) include coils (102) embedded in coil holder plates (101a, 101b). As shown, there are five coils (102) in each coil assembly (100) corresponding to and aligned with the five inner flux conductors (202). Magnets (201) are preferably made of high strength magnetic material such as Neodymium Iron Boron (NdFeB). Inner flux conductors (202), outer flux conductor (203), and coil holder plates (101a, 101b), are preferably made of silicon steel to provide high permeability and low hysteresis. These components may be composed of thin laminations to reduce eddy currents. Coils (102) are preferably wound from insulated copper wire, and in particularly preferred embodiments, are wound from the insulated copper wire manufactured for coils known as magnet wire. It should be noted that embedding the coils (102) in the lower and upper plates (101a, 101b) provides effective heat transfer and improved coil cooling because coil heat is directly transferred to the plate material, preferably steel or magnetic stainless steel, which has a much higher thermal conductivity than air.

Figure 4B:
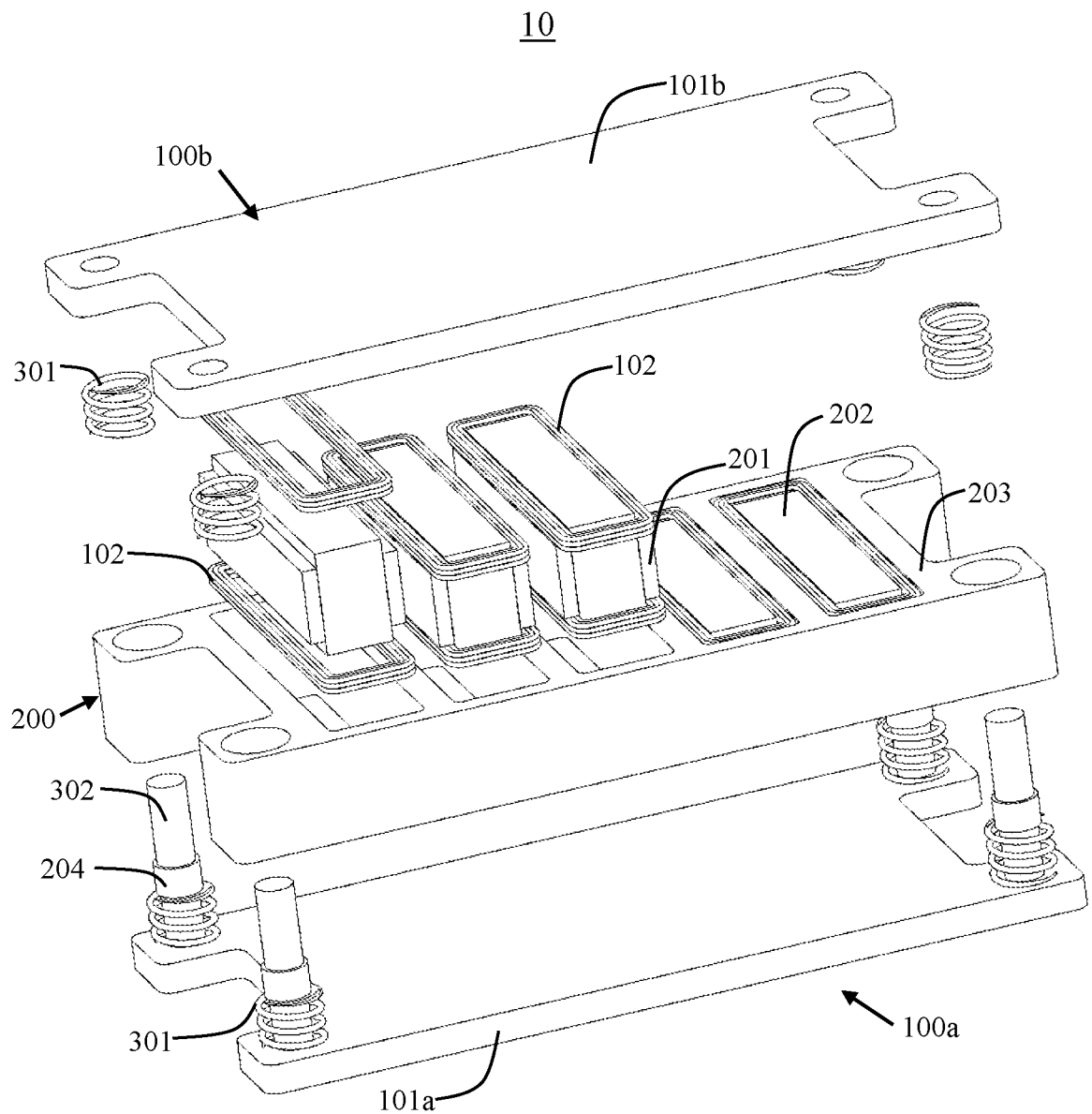
FIG. 4B is an exploded view of the one-dimensional electromagnetic array actuator of FIG. 3B.

FIG. 4B is an exploded view of a one-dimensional electromagnetic array (10) of a second embodiment of the invention, showing the internal components. Magnet assembly (200) includes magnets (201) between and in contact with inner flux conductors (202) and outer flux conductor (203). As shown, there are five inner flux conductors (202) and five pairs of magnets (201) forming a one-dimensional array, though the invention is not to be construed as limited to any particular number of magnet pairs. Arrays of from two to about 10 pairs of magnets are preferred in some aspects of the invention. Coils (102) surround the upper and lower ends of inner flux conductor (202), and are provided adjacent to magnets (201), and embedded in magnet assembly (200). As shown, there are 5 coils (102) embedded on the top of magnet assembly (200), and an additional 5 coils (102) are embedded on the bottom of magnet assembly (200), corresponding to and aligned with the 5 inner flux conductors (202). Magnets (201) are preferably made of high strength magnetic material such as Neodymium Iron Boron (NdFeB). Inner flux conductors (202), outer flux conductor (203) and lower and upper plates (101a, 101b), are preferably made of silicon steel to provide high permeability and low hysteresis. These components may be composed of thin laminations to reduce eddy currents. Drive coils (102) are preferably wound from insulated copper wire manufactured for coils, known as magnet wire.

Figure 4C:
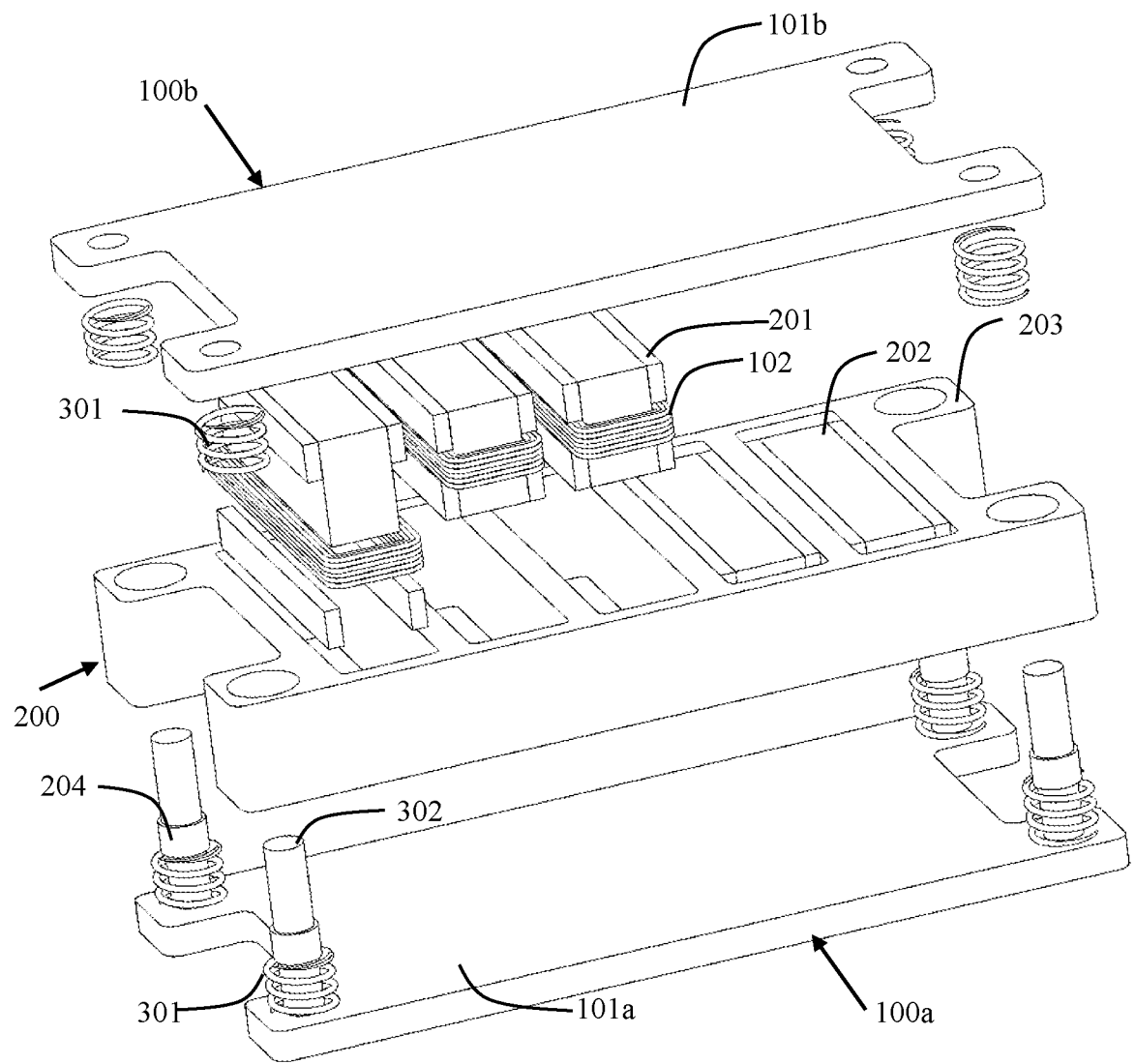
FIG. 4C is an exploded view of the one-dimensional electromagnetic array actuator of FIG. 3C.

FIG. 4C is an exploded view of a one-dimensional electromagnetic array (10) of a third embodiment of the invention, showing the internal components. Magnet assembly (200) includes magnets (201) between and in contact with inner flux conductors (202) and outer flux conductor (203). As shown, there are 5 inner flux conductors (202) forming a one-dimensional array, though the invention is not to be construed as limited to any particular number of inner flux conductors. Arrays of from about 2 to about 10 inner flux conductors are preferred in some aspects of the invention. Each inner flux conductor (202) has 4 adjacent magnets (201), one set of 2 magnets provided at the upper end of inner flux conductor (202), and another set of 2 magnets provided at the lower end of inner flux conductor (202). Coils (102) are provided around inner flux conductor (202), and separate the magnets (201) at the upper and lower ends of the inner flux conductor (202). As shown, there are 5 coils (102) in the magnet assembly (200), corresponding to and aligned with the 5 inner flux conductors (202). Magnets (201) are preferably made of high strength magnetic material such as Neodymium Iron Boron (NdFeB). Inner flux conductors (202), outer flux conductor (203) and lower and upper plates (101a, 101b), are preferably made of silicon steel to provide high permeability and low hysteresis. These components may be composed of thin laminations to reduce eddy currents. Drive coils (102) are preferably wound from insulated copper wire manufactured for coils, known as magnet wire.

As shown in each of FIGS. 4A, 4B, and 4C, magnet assembly (200) is slidably mounted by linear bearings (204) to stationary shafts (302) which connects the lower and upper coil assemblies (100a, 100b). Springs (301) between magnet assembly (200) and lower and upper coil assemblies (100a, 100b) provide a restoring and centering force.

Figure 5:
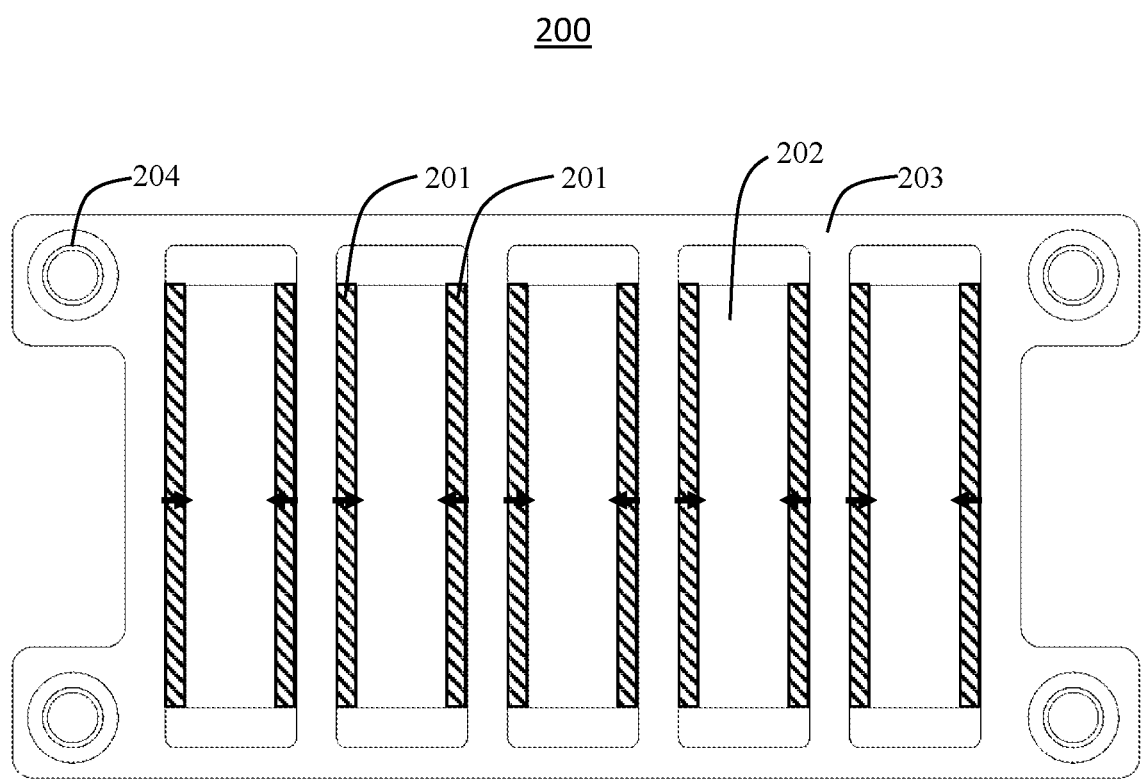
FIG. 5 is a top view of the magnet assembly of the one-dimensional electromagnetic array actuator according to the present invention.

FIG. 5 is a top view of magnet assembly (200) illustrating the polarization direction of magnets (201). Each magnet (201) is polarized from outer flux conductor (203) towards the inner flux conductor (202), which it contacts. Also shown are linear bearings (204), which slide on stationary shafts (302, shown in FIGS. 4A, 4B, and 4C).

Figure 6A:
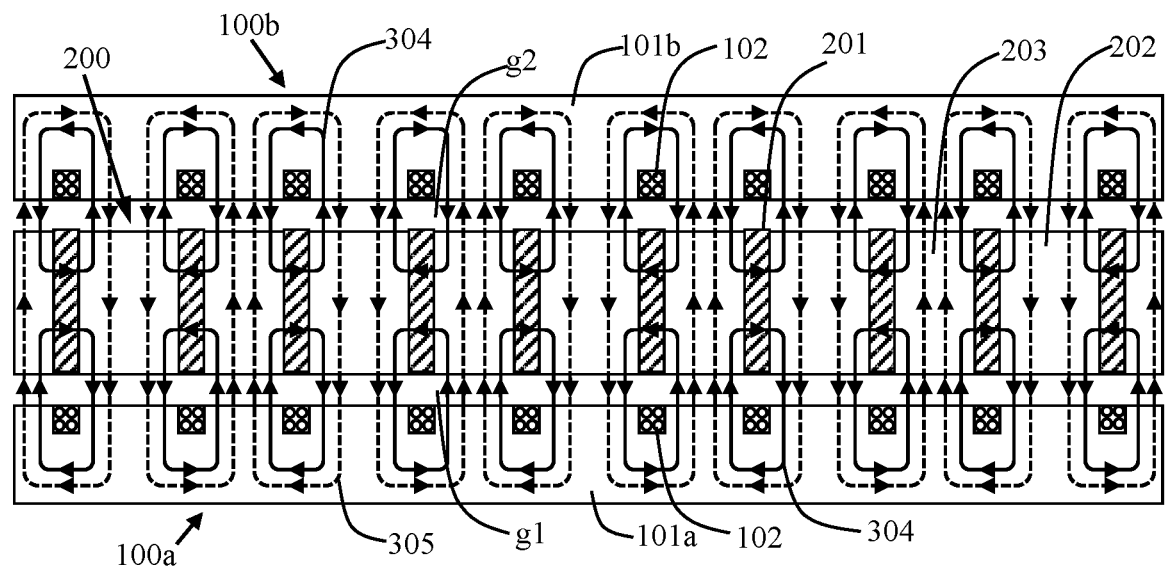
FIG. 6A is a simplified diagram illustrating the primary flux paths for the one-dimensional electromagnetic array actuator shown in FIG. 3A.

FIG. 6A is a simplified cross-sectional view illustrating the primary flux paths of the embodiment of the one-dimensional electromagnetic array (10) depicted in FIG. 4A. Flux paths (304) in solid lines are from permanent magnets (201), while flux paths (305) in dashed lines are from current through coils (102). Permanent magnet flux (304) flows from a permanent magnet (201) into an inner flux conductor (202), across lower gap (g1) or upper gap (g2), through lower coil holder plate (101a) or upper coil holder plate (101b), back across lower gap (g1) or upper gap (g2) to outer flux conductor (203), and then back to permanent magnet (201) in a closed loop. Coil current flux (305) flows around two coils (102) in a complete loop from lower coil holder plate (101a), across lower gap (g1), through inner flux conductor (202), across upper gap (g2), through upper coil holder plate (101b), back across upper gap (g2), through outer flux conductor (203), and back across lower gap (g1) to lower coil holder plate (101a).

Figure 6B:
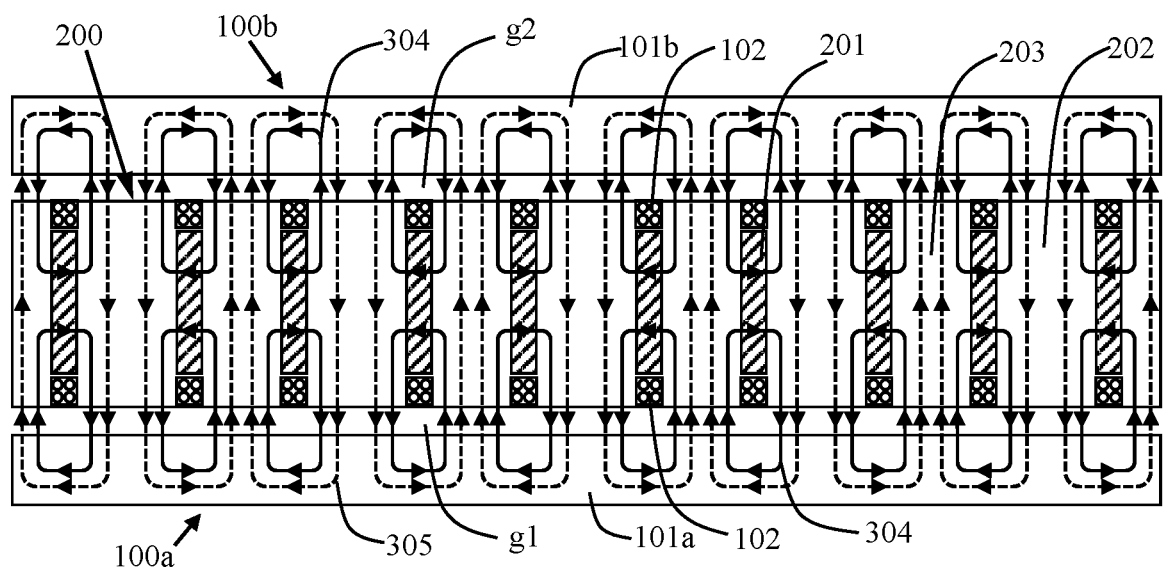
FIG. 6B is a simplified diagram illustrating the primary flux paths for the one-dimensional electromagnetic array actuator shown in FIG. 3B.

FIG. 6B is a simplified cross-sectional view illustrating the primary flux paths of the embodiment of the one-dimensional electromagnetic array (10) depicted in FIG. 4B. Flux paths (304) in solid lines are from permanent magnets (201) while flux paths (305) in dashed lines are from current through coils (102). Permanent magnet flux (304) flows from a permanent magnet (201) into an inner flux conductor (202), across lower gap (g1) or upper gap (g2), through lower plate (201a) or upper plate (201b), back across lower gap (g1) or upper gap (g2) to outer flux conductor (203), and then back to permanent magnet (201) in a closed loop. Coil current flux (305) flows around two coils (102) in a complete loop from inner flux conductor (202), across lower gap (g1), through lower plate (101a), back across lower gap (g1) and through outer flux conductor (203), across upper gap (g2), through upper plate (101b), and back across upper gap (g2), returning to inner flux conductor (202).

Figure 6C:
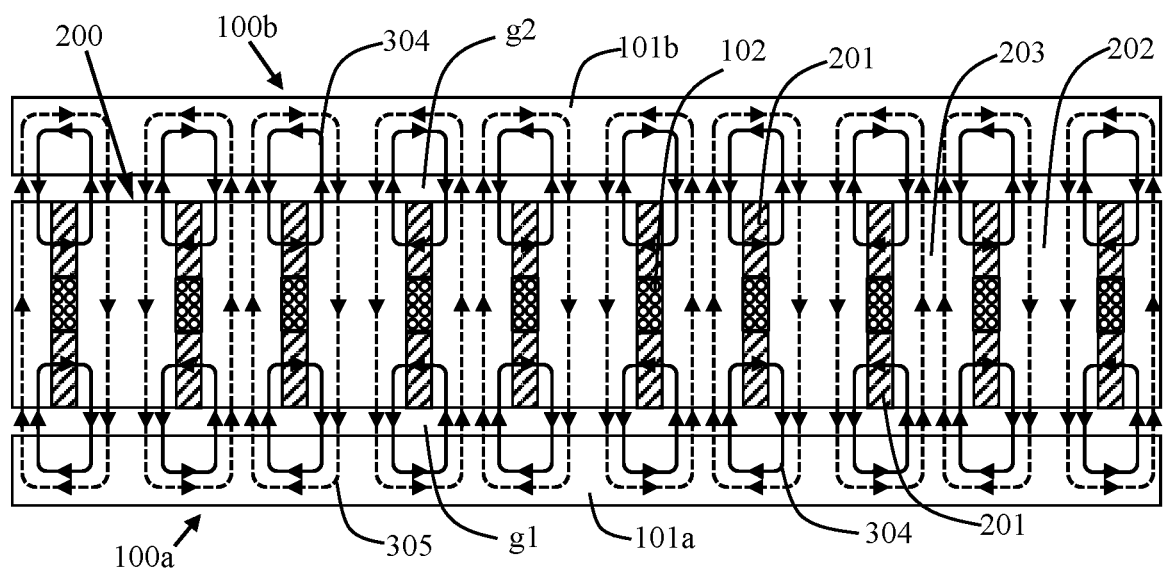
FIG. 6C is a simplified diagram illustrating the primary flux paths for the one-dimensional electromagnetic array actuator shown in FIG. 3C.

FIG. 6C is a simplified cross-sectional view illustrating the primary flux paths of the embodiment of the one-dimensional electromagnetic array (10) depicted in FIG. 4C. Flux paths (304) in solid lines are from permanent magnets (201) while flux paths (305) in dashed lines are from current through coils (102). Permanent magnet flux (304) flows from a permanent magnet (201) into an inner flux conductor (202), across lower gap (g1) or upper gap (g2), through lower plate (101a) or upper plate (101b), back across lower gap (g1) or upper gap (g2) to outer flux conductor (203), and then back to permanent magnet (201) in a closed loop. Coil current flux (305) flows around coil (102) in a complete loop from outer flux conductor (203), across upper gap (g2), through upper plate (101b), back across upper gap (g2), through inner flux conductor (202), across lower gap (g1), through lower plate (101a), and back across lower gap (g1), returning to outer flux conductor (203).

It can be seen in FIGS. 6A, 6B, and 6C that permanent magnet flux (304) and coil current flux (305) are in the same direction and add in lower gap (g1), while they are in opposite directions and tend to cancel in upper gap (g2). Thus, there is a net downward magnetic force on the magnet assembly (200), causing the assembly to move and generate inertial forces that are linear with current through drive coils (102). When current through drive coils (102) is reversed, the direction of coil current flux (305) also reverses, and the combination of permanent magnet flux and coil flux cancels in lower gap (g1) and adds in upper gap (g2), producing a net upward force on magnet assembly (200). Thus, inertial forces generated by the electromagnetic inertial force generators of the invention are both linear and reversible.

Figure 7:
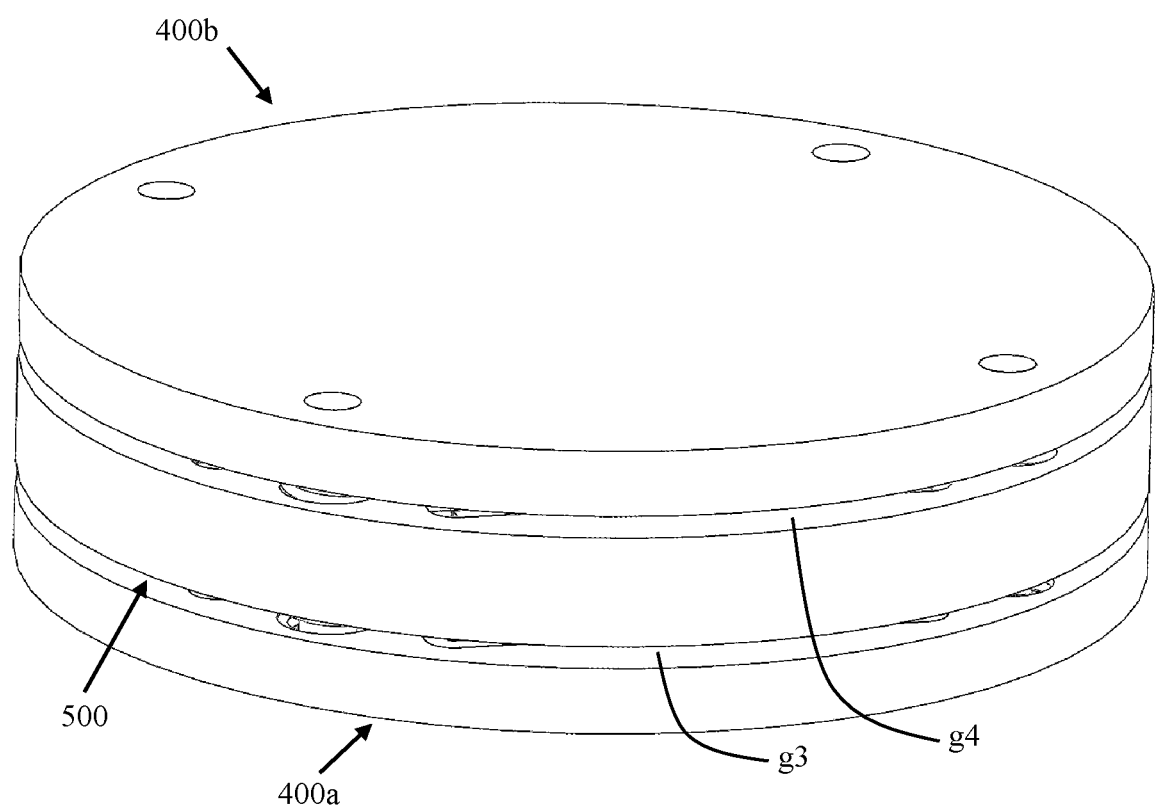
FIG. 7 is an overall view of a two-dimensional electromagnetic array actuator according to the present invention.

FIG. 7 is an overall view of two-dimensional electromagnetic array (40) showing magnet assembly (500) between lower and upper coil assemblies (400a, 400b). Also shown is gap (g3) between magnet assembly (500) and lower coil assembly (400a) and gap (g4) between magnet assembly (500) and upper coil assembly (400b). Magnet assembly (500) moves relative to lower and upper coil assemblies (400a, 400b) as allowed by gaps (g3) and (g4). Movement of magnet assembly (500) generates inertial forces.

Figure 8A:
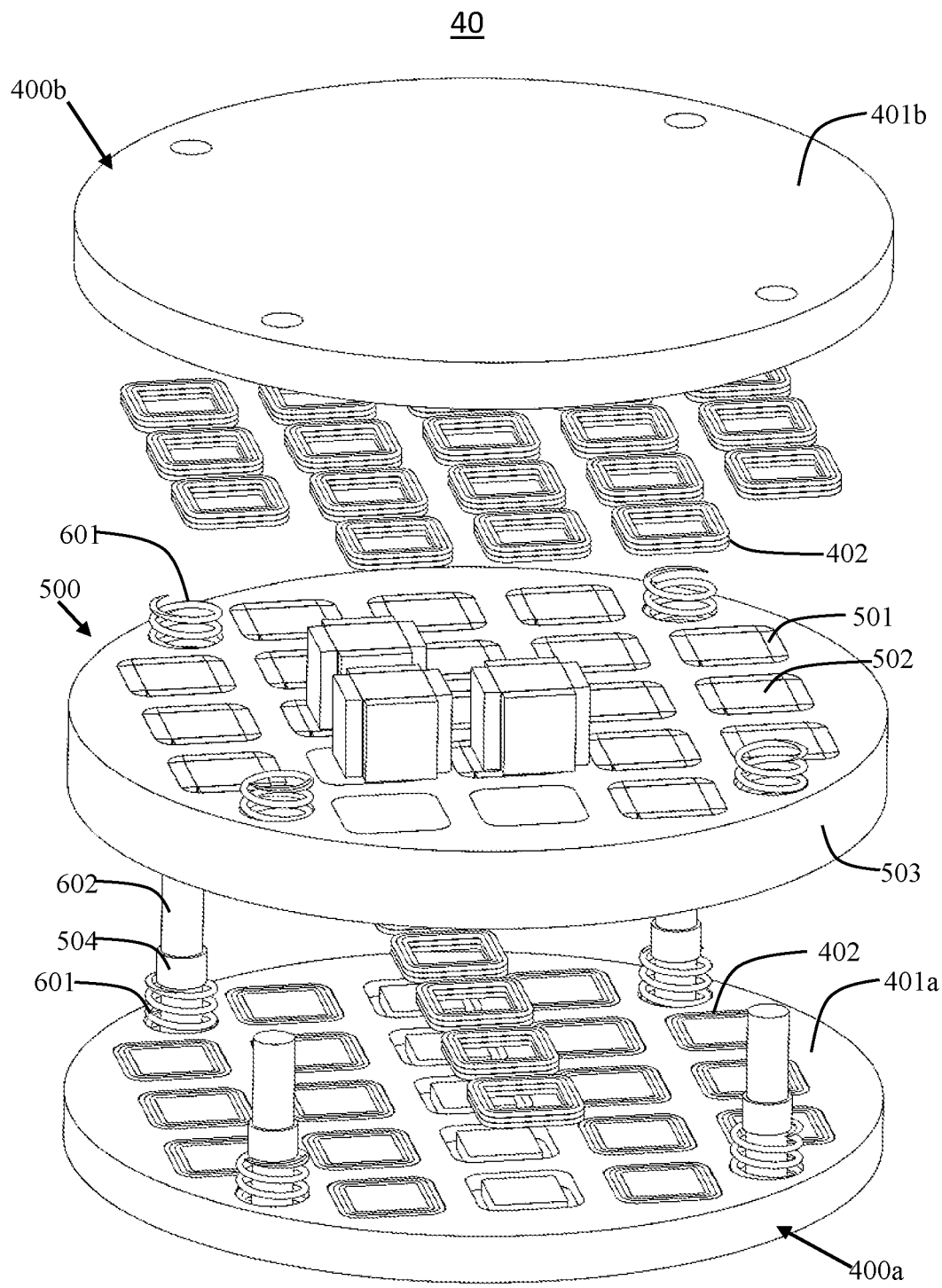
FIG. 8A is an exploded view of a two-dimensional electromagnetic array actuator according to a first embodiment of the present invention.

FIG. 8A is an exploded view of two-dimensional electromagnetic array (40) of a first embodiment of the invention, showing the internal components. Magnet assembly (500) includes magnets (501) between and in contact with inner flux conductors (502) and outer flux conductor (503). As shown, there are 21 inner flux conductors (502) forming a two-dimensional array, though the invention is not to be construed as limited to any particular number of inner flux conductors. Arrays of from about 4 to about 100 inner flux conductors are preferred in some aspects of the invention. Each inner flux conductor (502) is surrounded by 4 magnets (501). Lower and upper coil assemblies (400a, 400b) include coils (402) embedded in lower and upper plates (401a, 401b), which function as coil holder plates. As shown, there are 21 coils (402) in each of the lower and upper coil assemblies (400a, 400b) corresponding to and aligned with the 21 inner flux conductors (502). Magnets (501) are preferably made of high strength magnetic material such as Neodymium Iron Boron (NdFeB). Inner flux conductors (502), outer flux conductor (503) and lower and upper plates (401a, 401b), are preferably made of silicon steel to provide high permeability and low hysteresis. These components may be composed of thin laminations to reduce eddy currents. Drive coils (402) are preferably wound from insulated copper wire manufactured for coils, known as magnet wire.

Figure 8B:
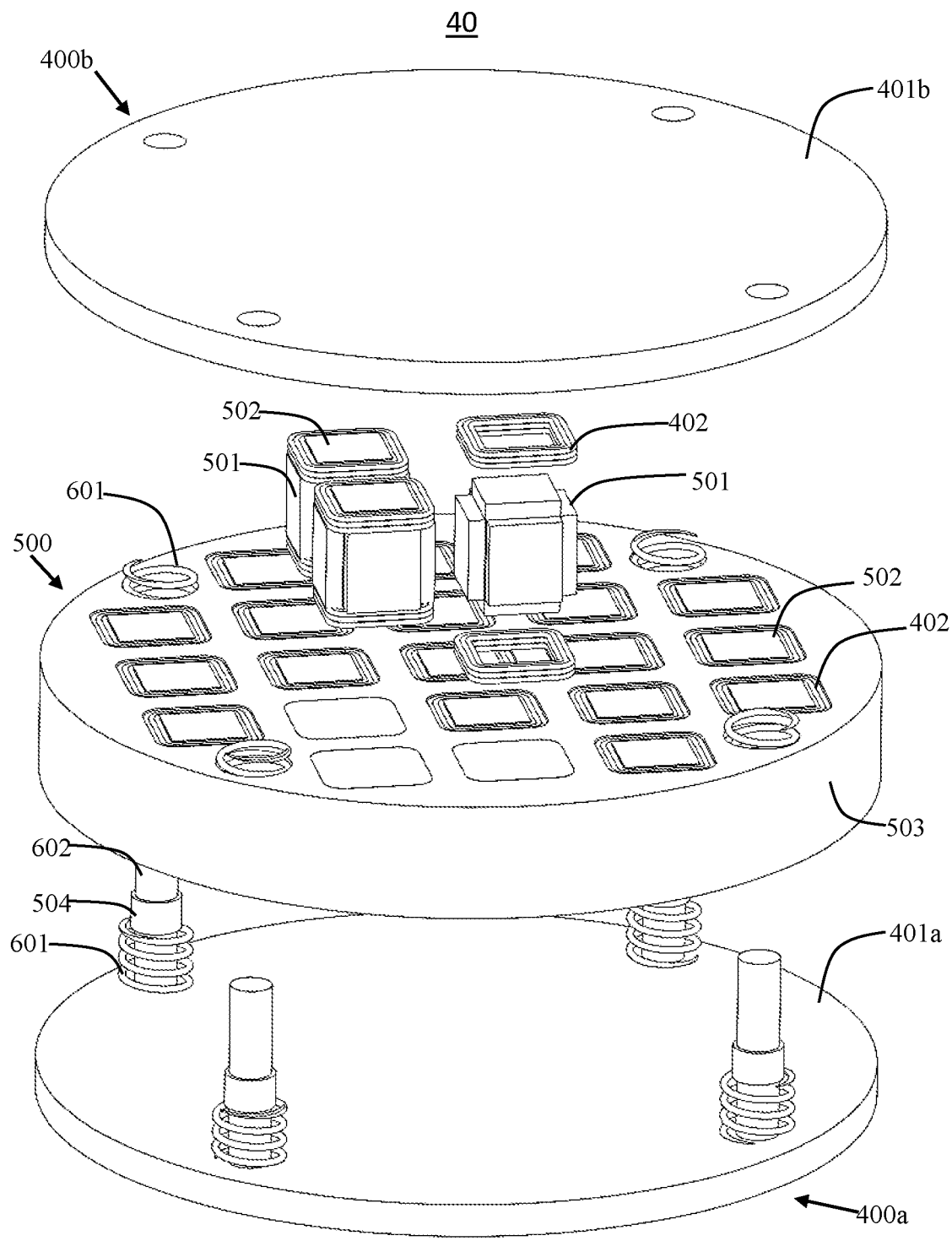
FIG. 8B is an exploded view of a two-dimensional electromagnetic array actuator according to a second embodiment of the present invention.

FIG. 8B is an exploded view of two-dimensional electromagnetic array (40) of a second embodiment of the invention, showing the internal components. Magnet assembly (500) includes magnets (501) between and in contact with inner flux conductors (502) and outer flux conductor (503). As shown, there are 21 inner flux conductors (502) forming a two-dimensional array, though the invention is not to be construed as limited to any particular number of inner flux conductors. Arrays of from about 4 to about 100 inner flux conductors are preferred in some aspects of the invention. Each inner flux conductor (502) is surrounded by 4 magnets (501). Coils (402) surround the upper and lower ends of inner flux conductor (502), and are provided adjacent to magnets (501), and embedded in magnet assembly (500). As shown, there are 21 coils (402) embedded on the top of magnet assembly (500), and an additional 21 coils (402) are embedded on the bottom of magnet assembly (500), corresponding to and aligned with the 21 inner flux conductors (502). Magnets (501) are preferably made of high strength magnetic material such as Neodymium Iron Boron (NdFeB). Inner flux conductors (502), outer flux conductor (503) and lower and upper plates (401a, 401b), are preferably made of silicon steel to provide high permeability and low hysteresis. These components may be composed of thin laminations to reduce eddy currents. Drive coils (402) are preferably wound from insulated copper wire manufactured for coils, known as magnet wire.

Figure 8C:
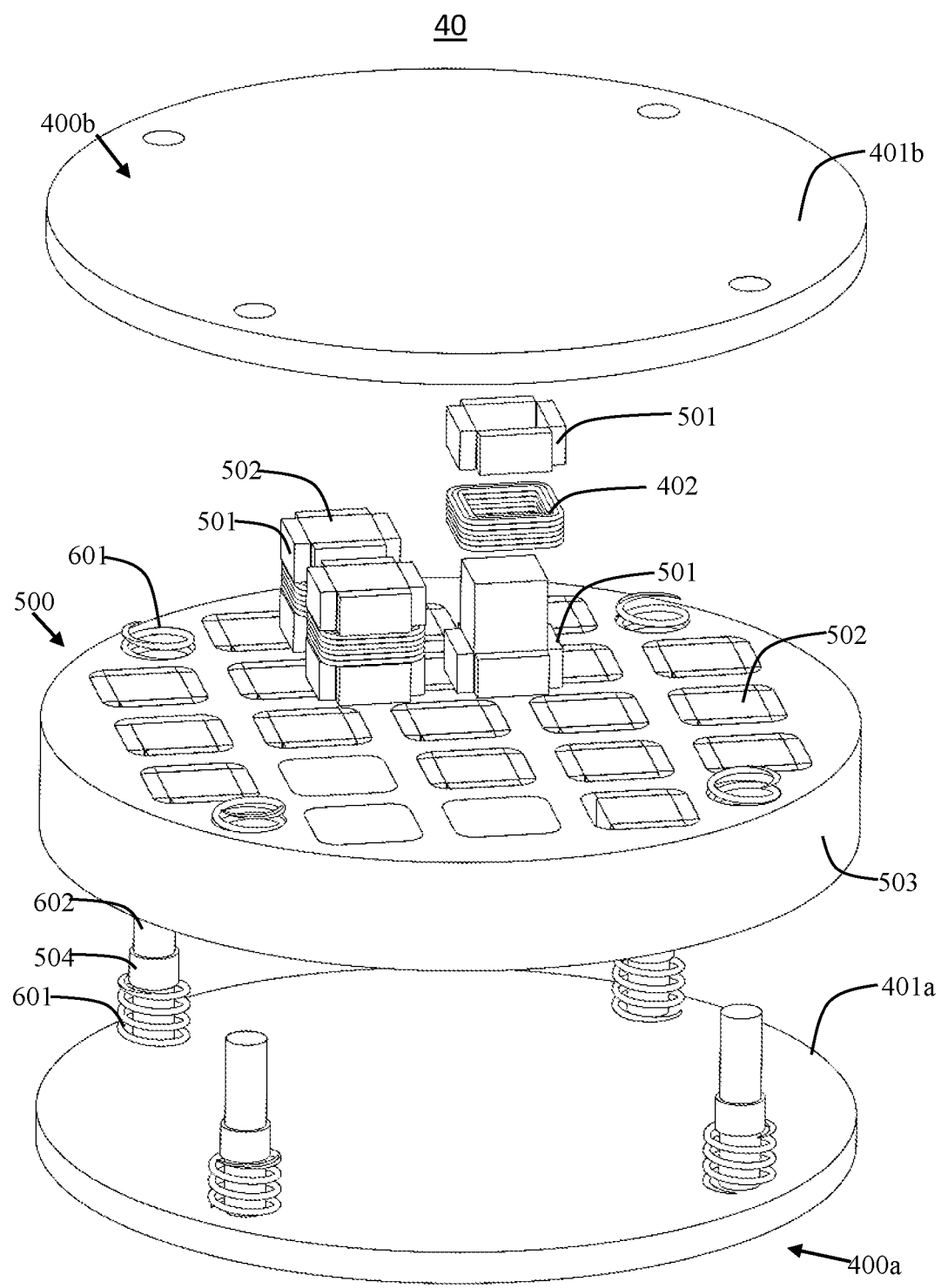
FIG. 8C is an exploded view of a two-dimensional electromagnetic array actuator according to a third embodiment of the present invention.

FIG. 8C is an exploded view of two-dimensional electromagnetic array (40) of a third embodiment of the invention, showing the internal components. Magnet assembly (500) includes magnets (501) between and in contact with inner flux conductors (502) and outer flux conductor (503). As shown, there are 21 inner flux conductors (502) forming a two-dimensional array, though the invention is not to be construed as limited to any particular number of inner flux conductors. Arrays of from about 4 to about 100 inner flux conductors are preferred in some aspects of the invention. Each inner flux conductor (502) is surrounded by 8 magnets (501), one set of 4 magnets provided at the upper end of inner flux conductor (502), and another set of 4 magnets provided at the lower end of inner flux conductor (502).

Coils (402) are provided around inner flux conductor (502), and separate the magnets (501) at the upper and lower ends of the inner flux conductor (502). As shown, there are 21 coils (402) in the magnet assembly (500), corresponding to and aligned with the 21 inner flux conductors (502). Magnets (501) are preferably made of high strength magnetic material such as Neodymium Iron Boron (NdFeB). Inner flux conductors (502), outer flux conductor (503) and lower and upper plates (401*a*, 401*b*), are preferably made of silicon steel to provide high permeability and low hysteresis. These components may be composed of thin laminations to reduce eddy currents. Drive coils (402) are preferably wound from insulated copper wire manufactured for coils, known as magnet wire.

As shown in each of FIGS. 8A, 8B, and 8C, magnet assembly (500) is slidably mounted by linear bearings (504) to stationary shafts (602) which connects the lower and upper assemblies (400*a*, 400*b*). Springs (601) between magnet assembly (500) and lower and upper assemblies (400*a*, 400*b*), provide a restoring and centering force.

Figure 9:
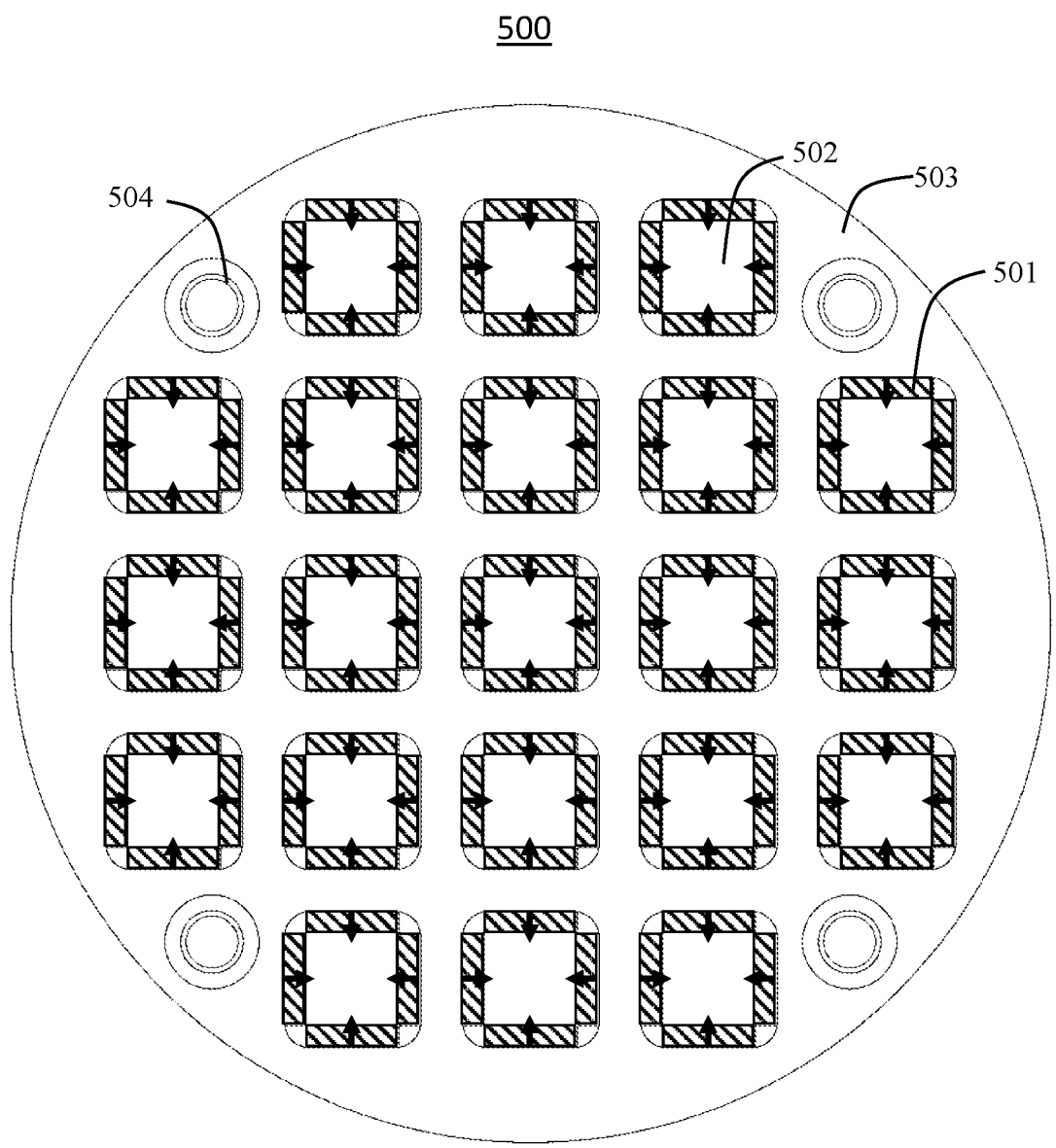
FIG. 9 is a top view of the magnet assembly of a two-dimensional electromagnetic array actuator according to an embodiment of the present invention.

FIG. 9 is a top view of magnet assembly (500) illustrating the polarization direction of magnets (501). Each magnet (501) is polarized from outer flux conductor (503) towards the inner flux conductor (502) which it contacts. Also shown are linear bearings (504) which slide on stationary shafts (602, shown in FIGS. 8A, 8B, and 8C).

Figure 10A:
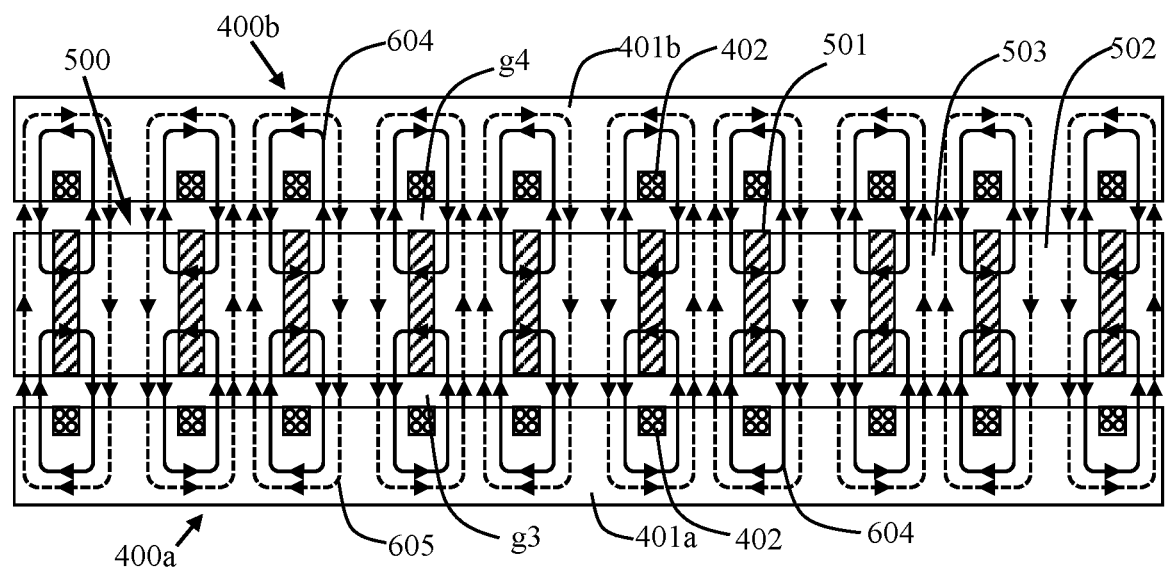
FIG. 10A is a simplified diagram illustrating the primary flux paths for the embodiment of the two-dimensional electromagnetic array actuator shown in FIG. 8A.

FIG. 10A is a simplified cross-sectional view illustrating the primary flux paths of the embodiment of the two-dimensional electromagnetic array (40) depicted in FIG. 8A. Flux paths (604) in solid lines are from permanent magnets (501) while flux paths (605) in dashed lines are from current through coils (402). Permanent magnet flux (604) flows from a permanent magnet (501) into an inner flux conductor (502), across lower gap (g3) or upper gap (g4), through lower plate (401*a*) or upper plate (401*b*), back across lower gap (g3) or upper gap (g4) to outer flux conductor (503), and then back to permanent magnet (501) in a closed loop. Coil current flux (605) flows around two coils (402) in a complete loop from lower coil holder plate (401*a*), across lower gap (g3), through outer flux conductor (503), across upper gap (g4), through upper plate (401*b*), back across upper gap (g4), through inner flux conductor (502), and back across lower gap (g3), returning to lower plate (401*a*).

Figure 10B:
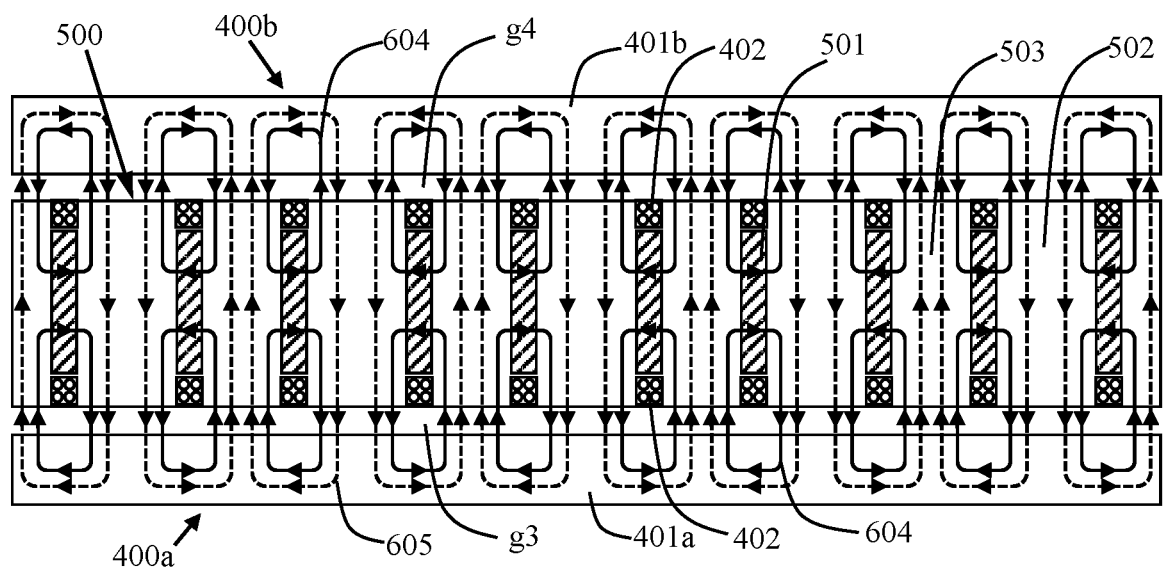
FIG. 10B is a simplified diagram illustrating the primary flux paths for the embodiment of the two-dimensional electromagnetic array actuator shown in FIG. 8B.

FIG. 10B is a simplified cross-sectional view illustrating the primary flux paths of the embodiment of the two-dimensional electromagnetic array (40) depicted in FIG. 8B. Flux paths (604) in solid lines are from permanent magnets (501) while flux paths (605) in dashed lines are from current through coils (402). Permanent magnet flux (604) flows from a permanent magnet (501) into an inner flux conductor (502), across lower gap (g3) or upper gap (g4), through lower plate (401*a*) or upper plate (401*b*), back across lower gap (g3) or upper gap (g4) to outer flux conductor (503), and then back to permanent magnet (501) in a closed loop. Coil current flux (605) flows around two coils (402) in a complete loop from inner flux conductor (502), across lower gap (g3), through lower plate (401*a*), back across lower gap (g3) and through outer flux conductor (503), across upper gap (g4), through upper plate (401*b*), and back across upper gap (g4), returning to inner flux conductor (502).

Figure 10C:
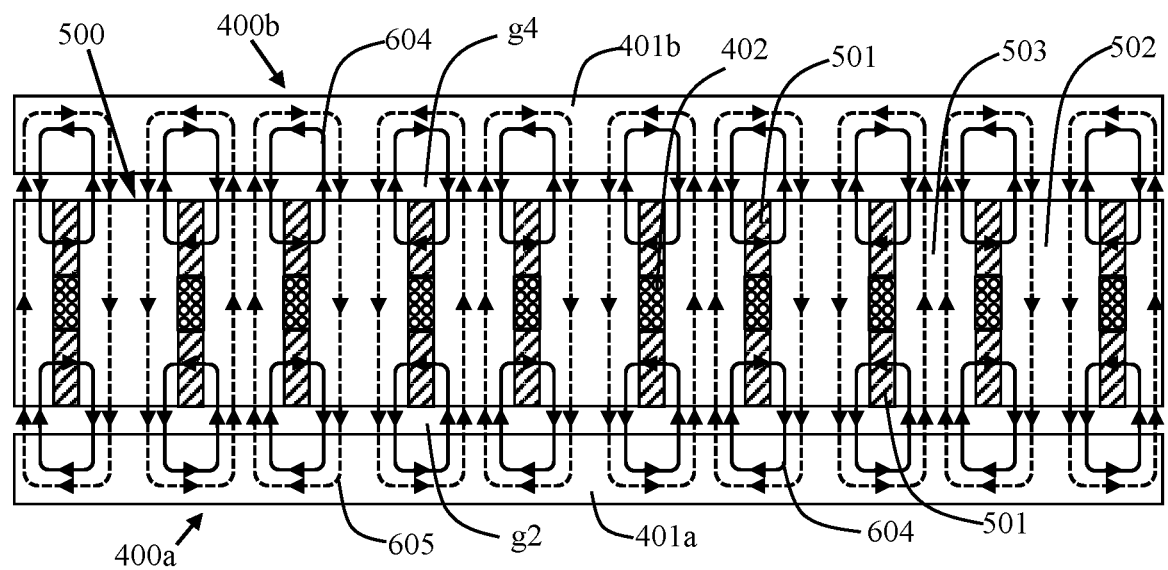
FIG. 10C is a simplified diagram illustrating the primary flux paths for the embodiment of the two-dimensional electromagnetic array actuator shown in FIG. 8C.

FIG. 10C is a simplified cross-sectional view illustrating the primary flux paths of the embodiment of the two-dimensional electromagnetic array (40) depicted in FIG. 8C. Flux paths (604) in solid lines are from permanent magnets (501) while flux paths (605) in dashed lines are from current through coils (402). Permanent magnet flux (604) flows from a permanent magnet (501) into an inner flux conductor (502), across lower gap (g3) or upper gap (g4), through lower plate (401*a*) or upper plate (401*b*), back across lower gap (g3) or upper gap (g4) to outer flux conductor (503), and then back to permanent magnet (501) in a closed loop. Coil current flux (605) flows around coil (402) in a complete loop from outer flux conductor (503), across upper gap (g4), through upper plate (401*b*), back across upper gap (g4), through inner flux conductor (502), across lower gap (g3), through lower plate (401*a*), and back across lower gap (g3), returning to outer flux conductor (503).

It can be seen in FIGS. 10A, 10B, 10C that permanent magnet flux (604) and coil current flux (605) are in the same direction and add in lower gap (g3), while they are in opposite directions and tend to cancel in upper gap (g4). Thus, there is a net downward magnetic force on the magnet assembly (500), causing the assembly to move and generate inertial forces that are linear with current through drive coils (402). When current through drive coils (402) is reversed, the direction of coil current flux (605) also reverses, and the combination of permanent magnet flux and coil flux cancels in lower gap (g3) and adds in upper gap (g4) producing a net upward force on magnet assembly (500). Thus, inertial forces generated by the electromagnetic inertial force generators of the invention are both linear and reversible.

It will, of course, be appreciated that the above description has been given by way of example only, and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. An electromagnetic inertial force generator, comprising:
    a lower assembly;
    an upper assembly;
    stationary shafts, that connect the upper assembly to the lower assembly;
    a magnet assembly;
    linear bearings that slidably mount the magnet assembly to the stationary shafts;
    springs between the magnet assembly and the lower assembly; and
    springs between the magnet assembly and the upper assembly; wherein
    a lower air gap separates the magnet assembly from the lower assembly; and wherein
    an upper air gap separates the magnet assembly from the upper assembly; and wherein
    the magnet assembly comprises:
        an array of inner flux conductors;
        an outer flux conductor; and
        radially polarized permanent magnets between and in contact with the inner flux conductors and outer flux conductor; and wherein
    each inner flux conductor is provided with a coil.

2. The electromagnetic inertial force generator of claim 1, wherein the first air gap and the second air gap accommodate axial motion of the magnet assembly.

3. The electromagnetic inertial force generator of claim 1, wherein the array of inner flux conductors is a one-dimensional array.

4. The electromagnetic inertial force generator of claim 1, wherein the array of inner flux conductors is a two-dimensional array.

5. The electromagnetic inertial force generator of claim 1, wherein the radially polarized permanent magnets provide bias flux across the lower and upper air gaps to combine with coil flux, linearizing flux output.

6. The electromagnetic inertial force generator of claim 1, wherein permanent magnet flux flows from the radially polarized permanent magnets into the array of inner flux conductors, across the lower air gap or upper air gap, through a lower or upper coil holder plate, back across the lower air gap or upper air gap to the outer flux conductor, and then back to the array of radially polarized permanent magnets in a closed loop.

7. The electromagnetic inertial force generator of claim 1, wherein when permanent magnet flux and coil current flux are in the same direction they add in the lower gap while they are in opposite directions and tend to cancel in the upper gap producing a net downward magnetic force on the magnet assembly, causing the assembly to move and generate inertial forces that are linear with current through drive coils.

8. The electromagnetic inertial force generator of claim 7, wherein when current through the drive coils is reversed, direction of coil current flux also reverses, and the combination of permanent magnet flux and coil flux cancels in the lower gap and adds in the upper gap producing a net upward force on the magnet assembly.

9. The electromagnetic inertial force generator of claim 1, wherein the lower and upper assemblies each independently comprise:
  lower and upper coil holder plates; and
  each of the coils embedded in each of the lower and upper coil holder plates, each coil corresponding to and aligned with each of the inner flux conductor.

10. The electromagnetic inertial force generator of claim 9, wherein coil current flux flows from the lower plate, across the lower air gap, through the outer flux conductor, across the upper air gap, through the upper plate, back across the upper air gap, through the array of inner flux conductors, and back across the lower air gap to the lower plate in a closed loop.

11. The electromagnetic inertial force generator of claim 9, wherein embedding each of the coils in the lower and upper coil holder plate provides effective heat transfer and improved coil cooling.

12. The electromagnetic inertial force generator of claim 1, wherein the inner flux conductors each independently comprise:
  the coils provided around upper and lower ends of the inner flux conductor,
  wherein the coils is provided adjacent to the radially polarized permanent magnets.

13. The electromagnetic inertial force generator of claim 12, wherein coil current flux flows from the array of inner flux conductors, across lower gap, through lower plate, back across lower gap and through outer flux conductor, across the upper gap, through the upper plate, and back across the upper gap to the array of inner flux conductors in a closed loop.

14. The electromagnetic inertial force generator of claim 12, wherein embedding each of the coils in the magnet assembly provides effective heat transfer and improved coil cooling.

15. The electromagnetic inertial force generator of claim 1, wherein the inner flux conductors each independently comprise:
  the coil provided around the inner flux conductor,
  wherein the coil is provided between two sets of radially polarized permanent magnets.

16. The electromagnetic inertial force generator of claim 15, wherein coil current flux flows from outer flux conductor, across upper gap, through upper plate, back across upper gap, through the array of inner flux conductors, across lower gap, through lower plate, and back across the lower gap to the outer flux conductor in a closed loop.

17. The electromagnetic inertial force generator of claim 15, wherein embedding each of the coils in the magnet assembly provides effective heat transfer and improved coil cooling.

* * * * *